United States Patent
Terry et al.

(10) Patent No.: US 9,432,903 B2
(45) Date of Patent: *Aug. 30, 2016

(54) METHOD AND APPARATUS FOR CELL UPDATE WHILE IN AN ENHANCED CELL_FACH STATE

(71) Applicant: InterDigital Technology Corporation, Wilmington, DE (US)

(72) Inventors: Stephen E. Terry, Northport, NY (US); Diana Pani, Montreal (CA); Paul Marinier, Brossard (CA); Rocco DiGirolamo, Laval (CA); Christopher R. Cave, Dollard-des-Ormeaux (CA)

(73) Assignee: InterDigital Technology Corporation, Wilmington, DE (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/581,565

(22) Filed: Dec. 23, 2014

(65) Prior Publication Data

US 2015/0156696 A1    Jun. 4, 2015

Related U.S. Application Data

(63) Continuation of application No. 13/362,724, filed on Jan. 31, 2012, now Pat. No. 8,954,072, which is a continuation of application No. 12/024,739, filed on Feb. 1, 2008, now Pat. No. 8,131,294.

(Continued)

(51) Int. Cl.
*H04W 36/30* (2009.01)
*H04W 36/10* (2009.01)
(Continued)

(52) U.S. Cl.
CPC .............. *H04W 36/30* (2013.01); *H04L 45/28* (2013.01); *H04W 36/10* (2013.01);
(Continued)

(58) Field of Classification Search
CPC . H04W 36/30; H04W 36/10; H04W 74/006; H04W 74/0833

USPC .......................................................... 370/216
See application file for complete search history.

(56) References Cited

U.S. PATENT DOCUMENTS 7,058,406 B1    6/2006 Lundell et al.
7,558,581 B2    7/2009 Hasegawa
(Continued)

FOREIGN PATENT DOCUMENTS

EP         1519597 A1    3/2005
EP         1689130 A1    8/2006
(Continued)

OTHER PUBLICATIONS

3rd Generation Partnership Project (3GPP), R1-062884, "Analysis of HSDPA in CELL_FACH State", Nokia, 3GPP TSG-RAN WG1 Meeting #46bis, Seoul, South Korea, Oct. 9-13, 2006, 5 pages.

(Continued)

*Primary Examiner* — Ronald B Abelson (74) *Attorney, Agent, or Firm* — Condo Roccia Koptiw LLP (57) ABSTRACT

A method and apparatus for cell update while in a Cell_FACH state are disclosed. After selecting a target cell, system information is read from the target cell including high speed downlink shared channel (HS-DSCH) common system information. A radio network temporary identity (RNTI) received in a source cell is cleared and a variable HS_DSCH_RECEPTION is set to TRUE. An HS-DSCH medium access control (MAC-hs) entity is configured based on the HS-DSCH common system information. High speed downlink packet access (HSDPA) transmission is then received in the target cell. A CELL UPDATE message is sent to notify of a cell change. The HSDPA transmission may be received using a common H-RNTI broadcast in the system information, a reserved H-RNTI as requested in a CELL UPDATE message, or a temporary identity which is a subset of a U-RNTI. The MAC-hs entity may be reset.

12 Claims, 7 Drawing Sheets

Related U.S. Application Data (60) Provisional application No. 60/887,874, filed on Feb. 2, 2007, provisional application No. 60/895,335, filed on Mar. 16, 2007, provisional application No. 60/915,058, filed on Apr. 30, 2007.

(51) Int. Cl.
*H04W 74/00* (2009.01)
*H04W 74/08* (2009.01)
*H04L 12/703* (2013.01)
*H04W 36/34* (2009.01)
*H04W 36/04* (2009.01)
*H04W 36/00* (2009.01)

(52) U.S. Cl.
CPC ..... *H04W 74/006* (2013.01); *H04W 74/0833* (2013.01); *H04W 36/0055* (2013.01); *H04W 36/04* (2013.01); *H04W 36/34* (2013.01)

(56) References Cited

U.S. PATENT DOCUMENTS

| | | | |
|---|---|---|---|
| 8,131,294 | B2 | 3/2012 | Di Girolamo et al. |
| 2003/0207702 | A1 | 11/2003 | Chen |
| 2004/0208160 | A1 | 10/2004 | Petrovic et al. |
| 2004/0224686 | A1 | 11/2004 | Pedlar |
| 2005/0054298 | A1 | 3/2005 | Chen |
| 2005/0070252 | A1 | 3/2005 | Farnsworth |
| 2005/0070274 | A1 | 3/2005 | Pedlar et al. |
| 2005/0118992 | A1 | 6/2005 | Jeong et al. |
| 2005/0181801 | A1 | 8/2005 | Funnell |
| 2005/0207374 | A1 | 9/2005 | Petrovic et al. |
| 2005/0266846 | A1 | 12/2005 | Kim |
| 2006/0111110 | A1 | 5/2006 | Schwarz et al. |
| 2006/0142021 | A1 | 6/2006 | Mueckenheim et al. |
| 2008/0089285 | A1* | 4/2008 | Pirskanen ............ H04L 1/1621 370/329 |
| 2008/0108346 | A1 | 5/2008 | Umatt et al. |
| 2008/0182594 | A1 | 7/2008 | Flore et al. |
| 2008/0253323 | A1 | 10/2008 | Fischer |
| 2008/0267061 | A1 | 10/2008 | Di Girolamo et al. |
| 2008/0311923 | A1 | 12/2008 | Petrovic et al. |
| 2009/0323624 | A1 | 12/2009 | Kim |
| 2011/0122818 | A1 | 5/2011 | Dwyer et al. |
| 2011/0136489 | A1 | 6/2011 | Funnell et al. |
| 2011/0207465 | A1 | 8/2011 | Dwyer et al. |
| 2012/0170550 | A1 | 7/2012 | Chao et al. |

FOREIGN PATENT DOCUMENTS

| | | | |
|---|---|---|---|
| EP | 2116087 | B1 | 1/2013 |
| JP | 2006-25437 | A | 1/2006 |
| RU | 2232470 | C2 | 7/2004 |
| RU | 2006105411 | A | 7/2006 |
| TW | I 468041 | B | 1/2015 |
| WO | WO 2004/015903 | A2 | 2/2004 |
| WO | WO 2005/006829 | A2 | 1/2005 |
| WO | WO 2005/117299 | A1 | 12/2005 |
| WO | WO 2006/084952 | A1 | 8/2006 |
| WO | WO 2006/134480 | A2 | 12/2006 |
| WO | WO 2008/097489 | A2 | 8/2008 |

OTHER PUBLICATIONS

3rd Generation Partnership Project (3GPP), R2-070166, "Reduction in State Transition Latency in Enhanced CELL_FACH", Samsung, 3GPP TSG-RAN WG2 Meeting #56bis, Sorrento, Italy, Jan. 15-19, 2007, 3 pages.

3rd Generation Partnership Project (3GPP), R2-070393, "Stage 2 Updates for Enhanced CELL_FACH State in FDD", Nokia, 3GPP TSG-RAN WG2 Meeting #56bis, Sorrento, Italy, Jan. 15-19, 2007, 36 pages.

3rd Generation Partnership Project (3GPP), R2-071556, "Introduction of Enhanced CELL_FACH State", Nokia, Siemens Networks, 3GPP TSG-2 Meeting #57, St. Julian's Malta, Mar. 26-30, 2007, 76 pages.

3rd Generation Partnership Project (3GPP), R2-072168, "Introduction of HS-DSCH Reception in CELL_FACH, URA_PCH and CELL_PCH", NSN, Nokia, 3GPP TSG-RAN2 #58, Kobe, Japan, May 6-11, 2007, 101 pages.

3rd Generation Partnership Project (3GPP), RP-060606, "Enhanced CELL_FACH State in FDD", 3GPP TSG-RAN WI#33, Sep. 2006, 4 pages.

3rd Generation Partnership Project (3GPP), TS 25.301 V11.0.0, "Technical Specification Group Radio Access Network, Radio Interface Protocol Architecture(Release 11)", Sep. 2012, 1-53.

3rd Generation Partnership Project (3GPP), TS 25.308 V6.3.0, "High Speed Downlink Packet Access (HSDPA); Overall description; Stage 2, (Release 6)", Dec. 2004, 28 pages.

3rd Generation Partnership Project (3GPP), TS 25.308 V6.4.0, "Technical Specification Group Radio Access Network, High Speed Downlink Packet Access (HSDPA), Overall Description, Stage 2, (Release 6)", Mar. 2007, 29 pages.

3rd Generation Partnership Project (3GPP), TS 25.308 V7.1.0, "Technical Specification Group Radio Access Network, High Speed Downlink Packet Access (HSDPA), Overall Description, Stage 2, (Release 7)", Dec. 2006, 34 pages.

3rd Generation Partnership Project (3GPP), TS 25.308 V7.5.0, "Technical Specification Group Radio Access Network, High Speed Downlink Packet Access (HSDPA), Overall Description, Stage 2, (Release 7)", Dec. 2007, 50 pages.

3rd Generation Partnership Project (3GPP), TS 25.308 V8.0.0, "Technical Specification Group Radio Access Network, High Speed Downlink Packet Access (HSDPA), Overall Description, Stage 2, (Release 8)", Dec. 2007, 50 pages.

3rd Generation Partnership Project (3GPP), TS 25.321 V6.11.0, "Technical Specification Group Radio Access Network, Medium Access Control (MAC) Protocol Specification, (Release 6)", Dec. 2006, 91 pages.

3rd Generation Partnership Project (3GPP), TS 25.321 V6.14.0, "Technical Specification Group Radio Access Network, Medium Access Control (MAC) Protocol Specification, (Release 6)", Sep. 2007, 94 pages.

3rd Generation Partnership Project (3GPP), TS 25.321 V7.7.0, "Technical Specification Group Radio Access Network, Medium Access Control (MAC) Protocol Specification, (Release 7)", Dec. 2007, 146 pages.

3rd Generation Partnership Project (3GPP), TS 25.321 V8.0.0, "Technical Specification Group Radio Access Network, Medium Access Control (MAC) Protocol Specification, (Release 8)", Dec. 2007, 146 pages.

3rd Generation Partnership Project (3GPP), TS 25.331 V6.12.0, "Technical Specification Group Radio Access Network, Radio Resource Control (RRC), Protocol Specification, (Release 6)", Dec. 2006, 1249 pages.

3rd Generation Partnership Project (3GPP), TS 25.331 V6.16.0, "Technical Specification Group Radio Access Network, Radio Resource Control (RRC), Protocol Specification, (Release 6)", Dec. 2007, 1252 pages.

3rd Generation Partnership Project (3GPP), TS 25.331 V7.7.0, "Technical Specification Group Radio Access Network, Radio Resource Control (RRC), Protocol Specification, (Release 7)", Dec. 2007, 1469 pages.

3rd Generation Partnership Project (3GPP), TS 25.331 V8.1.0, "Technical Specification Group Radio Access Network, Radio Resource Control (RRC), Protocol Specification, (Release 8)", Dec. 2007, 1471 pages.

European Telecommunications Standards Institute (ETSI), TS 125. 331 V7.3.0, "Universal Mobile Telecommunications System (UMTS); Radio Resource Control (RRC); Protocol specification, (Release 7)", Dec. 2006, 1319 pages.

European Telecommunications Standards Institute (ETSI), TS 25.321 V7.3.0, "Universal Mobile Telecommunications System (56) References Cited

OTHER PUBLICATIONS (UMTS); Medium Access Control (MAC) protocol specification, (Release 7)", Dec. 2006, 119 pages.

3$^{rd}$ Generation Partnership Project, (3GPP), R2-071693, "Introduction of HS-DSCH reception in CELL_FACH, URA_PCH and CELL_PCH", NSN, Nokia, 3GPP TSG RAN #58, Kobe, Japan, Dec. 1-Jan. 16, 2007, 96 pages.

\* cited by examiner

METHOD AND APPARATUS FOR CELL UPDATE WHILE IN AN ENHANCED CELL_FACH STATE

CROSS REFERENCE TO RELATED APPLICATION

This application is a continuation of U.S. patent application Ser. No. 13/362,724, filed Jan. 31, 2012, which is a continuation of U.S. patent application Ser. No. 12/024,739, filed Feb. 1, 2008, which issued as U.S. Patent No. 8,131,294 on Mar. 6, 2012, which claims the benefit of U.S. provisional application Ser. Nos. 60/887,874, filed Feb. 2, 2007, 60/895,335, filed Mar. 16, 2007, and 60/915,058 filed Apr. 30, 2007, all of which are incorporated by reference as if fully set forth.

FIELD OF INVENTION

The present invention is related to wireless communications.

BACKGROUND

Wireless transmit/receive units (WTRUs) in a UTRAN may be in either an idle mode or a connected mode. Based on WTRU mobility and activity while in the connected mode, the universal terrestrial radio access network (UTRAN) may direct the WTRU to transition between a number of radio resource control (RRC) sub-states: Cell_PCH, URA_PCH, Cell_FACH, and Cell_DCH states. User plane communication between the WTRU and the UTRAN is only possible while in Cell_FACH and Cell_DCH states. The Cell_DCH state is characterized by dedicated channels in both the uplink and the downlink. On the WTRU side, this corresponds to continuous transmission and reception and can be demanding on user power requirements. The Cell_FACH state does not use dedicated channels and thus allows better power consumption, at the expense of a lower uplink and downlink throughput.

The Cell_FACH state is well-suited for signaling traffic, (e.g., transmission of a CELL UPDATE message), and for applications requiring very low uplink throughput. Uplink communication is achieved through a random access channel (RACH) that is mapped to a physical random access channel (PRACH). The RACH is a contention-based channel with a power ramp-up procedure to acquire the channel and to adjust transmit power. Downlink communication is through a forward access channel (FACH) that is mapped to a secondary common control physical channel (S-CCPCH). System information including the setup details for the uplink (i.e., RACH) and downlink (i.e., FACH) channels to be used in Cell_FACH is read from a broadcast channel (BCH).

In the Cell_FACH state, mobility is handled autonomously by the WTRU. The concept of soft handover does not currently (as of Release 6 of the third generation partnership project (3GPP) standard) exist within Cell_FACH, A WTRU independently takes measurements, and determines which cell to camp on.

The possibility of using high speed downlink packet access (HSDPA) in the Cell_FACH state, (i.e., enhanced Cell_FACH state), has been studied by the standardization bodies. HSDPA is a feature that was introduced in Release 5 of the 3GPP specifications to operate in the Cell_DCH state. HSDPA tries to make better use of the downlink shared capacity by using three key concepts: adaptive modulation and coding (AMC), retransmissions using a hybrid automatic repeat request (HARQ) scheme, and Node-B scheduling—all operating at a very fast rate, Every WTRU having an HSDPA connection is assigned an HS-DSCH radio network temporary identifier (H-RNTI). The H-RNTI is unique within a cell and assigned by the serving radio network controller (SRNC). A WTRU is attached to a single serving cell, (i.e., Node B). The WTRU has to be told about the physical channel resources to use (high speed physical downlink shared channel (HS-PDSCH) information), as well as how to set up the HARQ processes and the HARQ memory.

As a result of mobility, the WTRU may change from one serving cell (source Node B) to another (target Node B). The UTRAN controls the timing of this change. The SRNC must stop sending data to the source Node B and begin sending data to the target Node B with the new configuration. At the same time, the RNC must send a control message (RRC message) to reset the HS-DSCH medium access control (MAC-hs) entity at the WTRU.

The MAC-hs reset would entail flushing soft buffer for all configured HARQ processes; stopping all active re-ordering release timers (T1) and setting all timers (T1) to their initial value; starting transmission sequence number (TSN) with value 0 for the next transmission on every configured HARQ process; initialising the variables RcvWindow_UpperEdge and next_expected_TSN to their initial values; disassembling all MAC-hs protocol data units (PDUs) in the re-ordering buffer and delivering all dedicated channel medium access control (MAC-d) PDUs to the MAC-d entity; flushing the re-ordering buffer; and in some cases, indicating to all acknowledged mode (AM) radio link control (RLC) entities mapped on a high speed downlink shared channel (HS-DSCH) to generate a status report.

When trying to transmit HSDPA while in the enhanced Cell_FACH state, there are many problems that need to be addressed. HSDPA is currently standardized to operate only in the Cell_DCH state. The WTRU makes use of variable HS_DSCH_RECEPTION to verify whether or not HSDPA reception is allowed. In the enhanced Cell_FACH state, the WTRU receives common channel set up information in the broadcast system information. However, no HSDPA configuration information is carried, in the broadcast information.

The enhanced Cell_FACH state will use downlink signaling radio bearers on common logical channels (common control channel (CCCH) and common traffic channel (CTCH)). Typical RRC messages carried on these radio bearers include RRC CONNECTION SETUP message and CELL UPDATE CONFIRM message. The former message poses a problem as the HSDPA configuration details are included inside this message. For Cell_DCH, WTRUs wait until reading the configuration details before allowing HSDPA communication. This is not possible for enhanced Cell_FACH, as the message must be received using HSDPA communication, Conventional 3GPP Release 6 specifications do not provide support for operation of HS-DSCH in Cell_FACH.

When a WTRU is in an enhanced Cell_FACH state, the WTRU will execute the cell update procedure for a number of reasons, (e.g., cell reselection, radio link failure, radio link control (RLC) unrecoverable error, etc.). With respect to the cell update procedure, many difficulties may arise. For example, the WTRU may be asked to transition to enhanced Cell_FACH but it requires a way to retrieve HSDPA configuration information. The cell reselection procedures are controlled by the WTRU. As a result, the UTRAN is not able to execute a timely and synchronized MAC-hs reset. In fact, after a cell reselection, the source Node B would continue to send information to the WTRU, even though the latter has stopped listening. The UTRAN would only be aware of the change after receiving a CELL UPDATE message. An additional problem may occur if the WTRU needs to send an RLC status report as a result of the MAC-hs reset. After a cell reselection, the UTRAN is notified with a CELL UPDATE message. The UTRAN responds with a CELL UPDATE CONFIRM message using a dedicated control channel (DCCH). This message has to be sent to a dedicated WTRU but the WTRU has not yet been assigned a dedicated H-RNTI (the information would typically be contained within the message itself).

When a WTRU is in an enhanced Cell_FACH state, it is generally agreed that the MAC-c/sh functionality can be reduced. In particular, the WTRU identity (ID) is already carried in the MAC-hs header and as a result it need. not be repeated in the MAC header.

SUMMARY

The present application is related to a method and apparatus for cell update while in a Cell_FACH state. After selecting a target cell, system information is read from the target cell. This system information includes the HS-DSCH common system information, if supported in the target cell. The H-RNTI and C-RNTI received in source cell are cleared and a radio resource control (RRC) HS_DSCH_RECEPTION variable is used to control HS_DSCH reception. A MAC hs entity is configured based on the HS-DSCH common system information. HSDPA transmission is then received in the target cell, A CELL UPDATE message is sent to notify of a cell change. The HSDPA transmission may be received using a common H-RNTI broadcast in the system information, a reserved H-RNTI as requested in a CELL UPDATE message, or a temporary identity which is a subset of a U-RNTI. Following a cell reselection, radio link failure, or RLC unrecoverable error, the MAC-hs entity may be reset.

BRIEF DESCRIPTION OF THE DRAWINGS

A more detailed understanding may be had from the following description of the embodiments, given by way of example and to be understood in conjunction with the accompanying drawings wherein.

DETAILED DESCRIPTION

When referred to hereafter, the terminology "WTRU" includes but is not limited to a user equipment (LIE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

When referred to hereafter, the terminology "MAC-hs entity" includes not only the conventional MAC-hs entity but also the high speed MAC entity that supports HS-DSCH reception in CELL_FACH, CELL_PCH and URA_PCH states, that is also known as "enhanced MAC-hs (MAC-ehs) entity."

Figure 1:
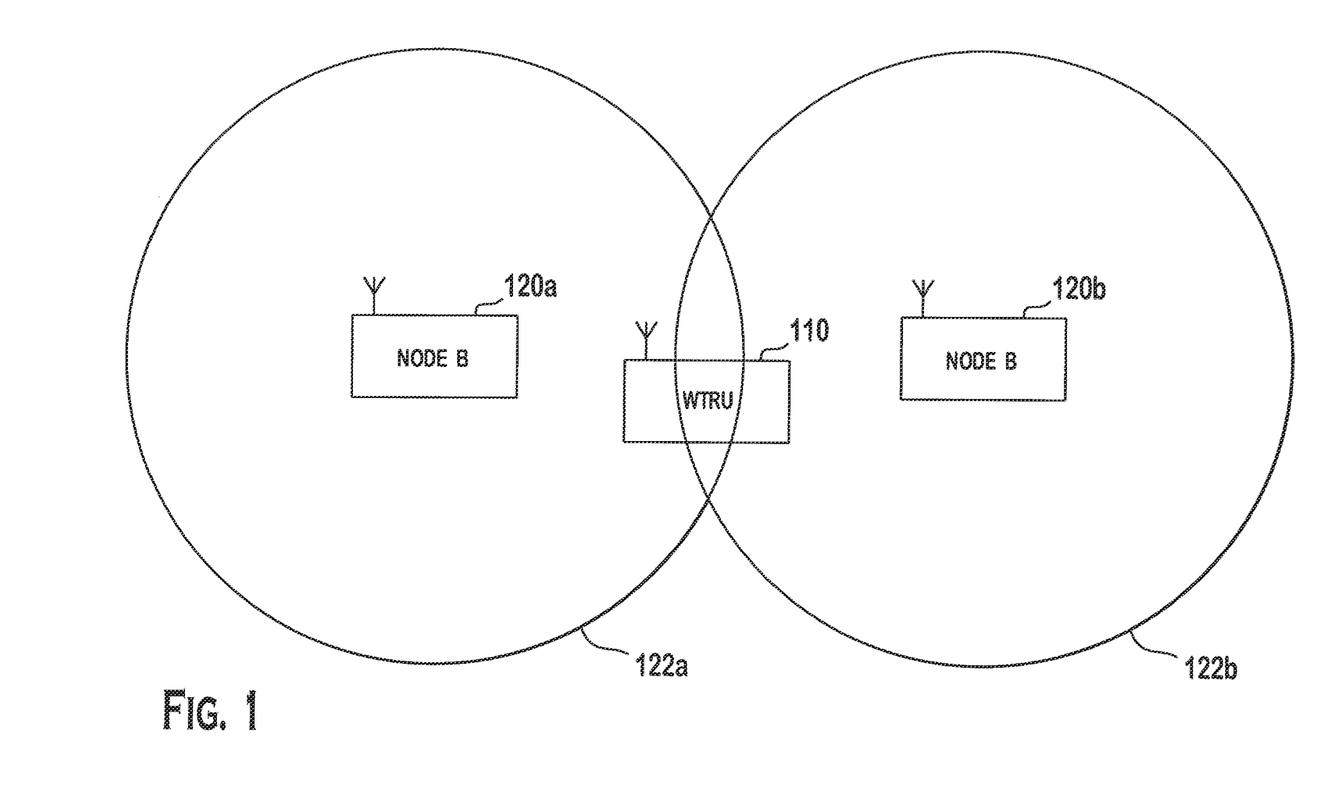
FIG. 1 shows an example WTRU and UTRAN.

FIG. 1 shows an example WTRU 110 and UTRAN including Node-Bs 120a, 120b. FIG. 1 illustrates only two cells 122a, 122b and two Node-Bs 120a, 120b for simplicity. For HSDPA transmissions, the WTRU 110 receives a WTRU identity, (i.e., H-RNTI), and HSDPA configuration information from the UTRAN. The methods for assigning the H-RNTI and HSDPA configuration information to the WTRU 110 in a Cell_FACH state are explained hereinafter.

In a Cell_DCH state, every WTRU with an active HSDPA communication is assigned a unique (cell-specific) H-RNTI. However, this is not always possible in a Cell_FACH state. It has been proposed to use both a common H-RNTI and a dedicated H-RNTI while in the Cell_FACH state. A CCCH transmission mapped to the HS-DSCH uses the common H-RNTI, and DCCH and DTCH transmissions mapped to the HS-DSCH use the dedicated H-RNTI. The common H-RNTI may be broadcast as part of the system information either by adding a new information element to a conventional system information block (SIB), or by defining a new SIB and associated schedule.

The information regarding the dedicated H-RNTI may be carried in RRC messages, However, a problem occurs if the WTRU 110 does not yet have a dedicated H-RNTI but the downlink RRC message, (e.g., CELL UPDATE CONFIRM), is sent using a DCCH mapped to the HS-DSCH while the WTRU is in a Cell_FACH state. In accordance with one embodiment, an RRC message including the WTRU identity, (e.g., a CELL UPDATE CONFIRM message), may be sent via a CCCH over the HS-DSCH using the common H-RNTI and the dedicated H-RNTI may be included in the RRC message. Alternatively, the RRC message, (e.g., CELL UPDATE CONFIRM message), may be sent using a DCCH over an FACH, and a MAC-c header includes the WTRU identity, Alternatively, a bank of reserved H-RNTIs (RH-RNTIs) may be used solely for the purpose of the DCCH messages transmitted via the HS-DSCH when a WTRU 110 has no dedicated H-RNTI, The bank of RH-RNTIs may be broadcast as part of the system information and may be indexed. The WTRU 110 randomly selects one of the RH-RNTI indices and sends this information in a CELL UPDATE message. The CELL UPDATE message may be expanded to include a new information element (IE) which includes the index of the RH-RNTI. The UTRAN responds with a CELL UPDATE CONFIRM message via the DCCH that is mapped to HS-DSCH using the indexed RH-RNTI, (i.e., the indexed RH-RNTI is signaled in the HS-SCCH). An address collision may occur if multiple WTRUs select the same RH-RNTI. The UTRAN makes sure that multiple WTRUs do not select the same RH-RNTI. If an address collision occurs, the UTRAN may simply refrain from sending the CELL UPDATE CONFIRM message and wait for retransmission of the CELL UPDATE message.

Alternatively, when assigning a U-RNTI, the U-RNTI may be assigned. in a way that a WTRU 110 may use a subset of the U-RNTI, (e.g., the least significant 16-bits), as a temporary dedicated H-RNTI, and this temporary H-RNTI may be used for the DCCH transmissions, (e.g., transmission of the CELL UPDATE CONFIRM message), via the HS-DSCH. The UTRAN is responsible for preventing the address collision in this case.

For a WTRU 110 to receive HSDPA transmission, the WTRU 110 requires HSDPA configuration information from the UTRAN. Typically, the HSDPA configuration information is provided in an RRC message, (such as RRC CONNECTION SETUP message, CELL UPDATE CONFIRM message, or the like). For a WTRU 110 in a Cell_FACH state, HSDPA has to be configured even before these RRC messages can be received.

Common HS-DSCH system information may be sent as part of the broadcast; system information. The broadcast information may include enhanced Cell_FACH capability, (i.e., indication that the cell supports enhanced Cell_FACH WTRUs), common high speed physical downlink shared channel (HS-PDSCH) information, (e.g., an HS-SCCH scrambling code and, channelization code, channel quality indicator (CQI) feedback information, etc.), common HARQ information, (e.g., the number of HARQ processes and memory partitioning, etc.), and optionally RH-RNTIs to be used for sending DCCH messages when no dedicated H-RNTI is available. The broadcast system information may include a set of default common HSDPA configurations, and a WTRU may choose one of them, (for example, based on its initial WTRU identity).

After receiving the HSDPA configuration information, the WTRU 110 configures a MAC-hs entity. A separate MAC-hs entity may be configured for each RNTI address, For example, if a WTRU 110 in an enhanced Cell_FACH state is configured with a common H-RNTI and a dedicated H-RNTI, two separate MAC-hs entities may be configured, (one for the common H-RNTI and the other for the dedicated H-RNTI).

Alternatively, a single MAC-hs entity may be setup per WTRU, and traffic is segregated by storing in different priority queues based on the logical channel. The Node B would be required to change the H-RNTI used for transmission depending on the priority queue selected by the scheduler.

The WTRU 110 evaluates a variable HS_DSCH_RECEPTION in numerous occasions as defined in 3GPP technical specification (TS) 25.331. The variable HS_DSCH_RECEPTION denotes "high speed shared control channel (HS-SCCH) and HS-DSCH reception procedures are ongoing." When the variable HS_DSCH_RECEPTION is evaluated to FALSE, it forces the WTRU 110 to perform a complete HSDPA reset (including a MAC-hs reset and a clearing all HARQ resources). The variable HS_DSCH_RECEPTION shall be set to TRUE when certain conditions are met. In order to operate HSDPA in a Cell_FACH state, the a HS_DSCH_RECEPTION variable must evaluate to TRUE when the following three conditions are met: (1) a WTRU is in an enhanced Cell_FACH state; (2) a downlink radio link is configured as a serving HS-DSCH radio link; and (3) there is at least one radio bearer mapped to an HS-DSCH. It should be noted that the variable "HS_DSCH_RECEPTION" may be the same variable as the one in a CELL_DCH state, or new variables may be defined for WTRUs operating in a CELL_FACH state. It should also be noted that the variable "HS_DSCH_RECEPTION" may be referred to as different names, or other variable may be used for the same function.

Figure 2:
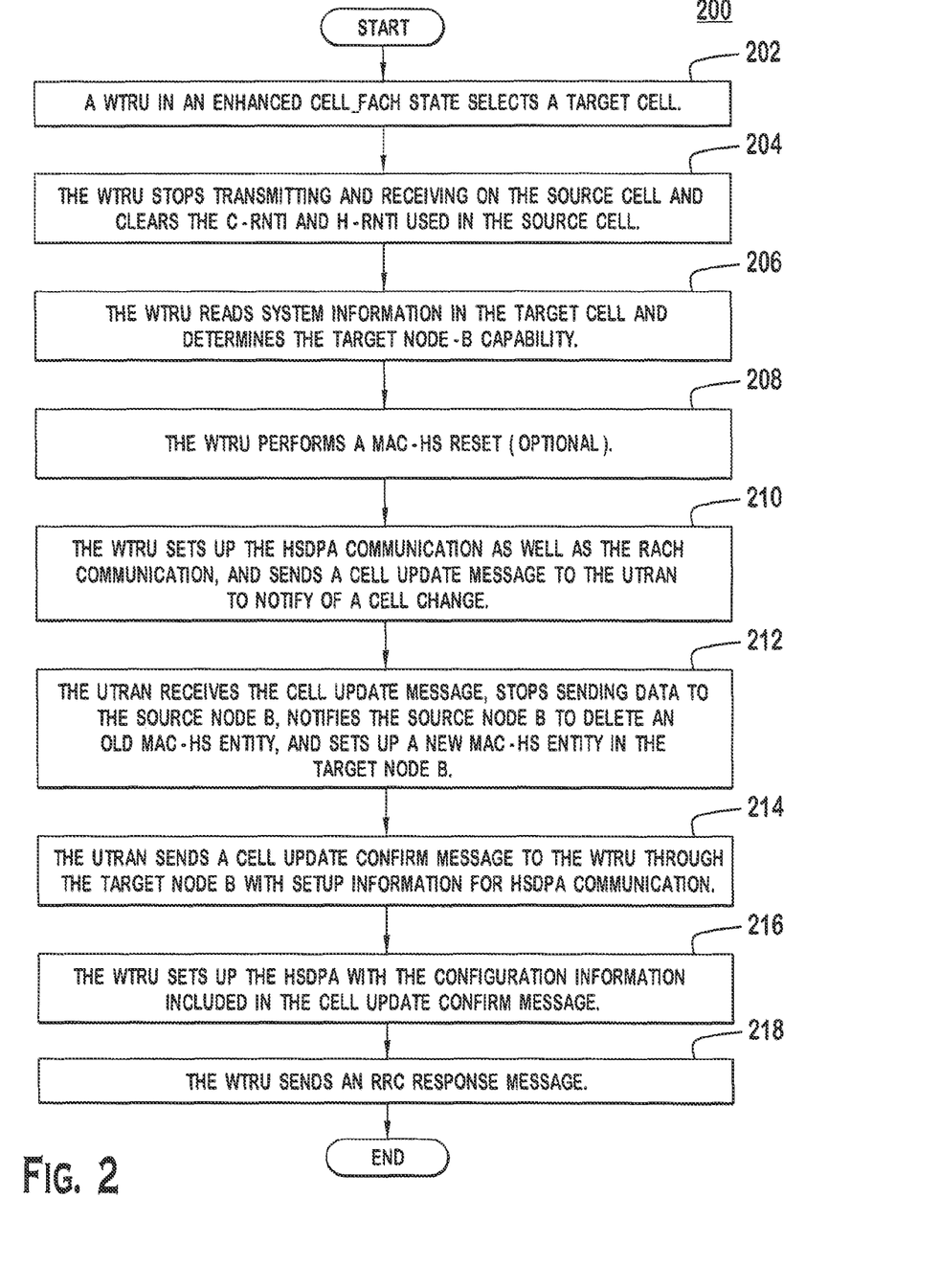
FIG. 2 is a flow diagram of an example process for cell update in accordance with one embodiment.

Cell update procedures are explained hereinafter. FIG. 2 is a flow diagram of a process 200 for cell update in accordance with one embodiment. In this example, a WTRU 110 moves from a source cell 122a with enhanced Cell_FACH support to a target cell 122b with enhanced Cell_FACH support. A WTRU 110 in an enhanced Cell_FACH state selects a target. cell 122b, (step 202). The WTRU 110 stops transmitting and receiving on the source cell 122a and clears the C-RNTI and H-RNTI used in the source cell 122a (step 204). The WTRU 110 reads system information in the target cell 122b and determines the target Node B capability (step 206).

Figure 3:
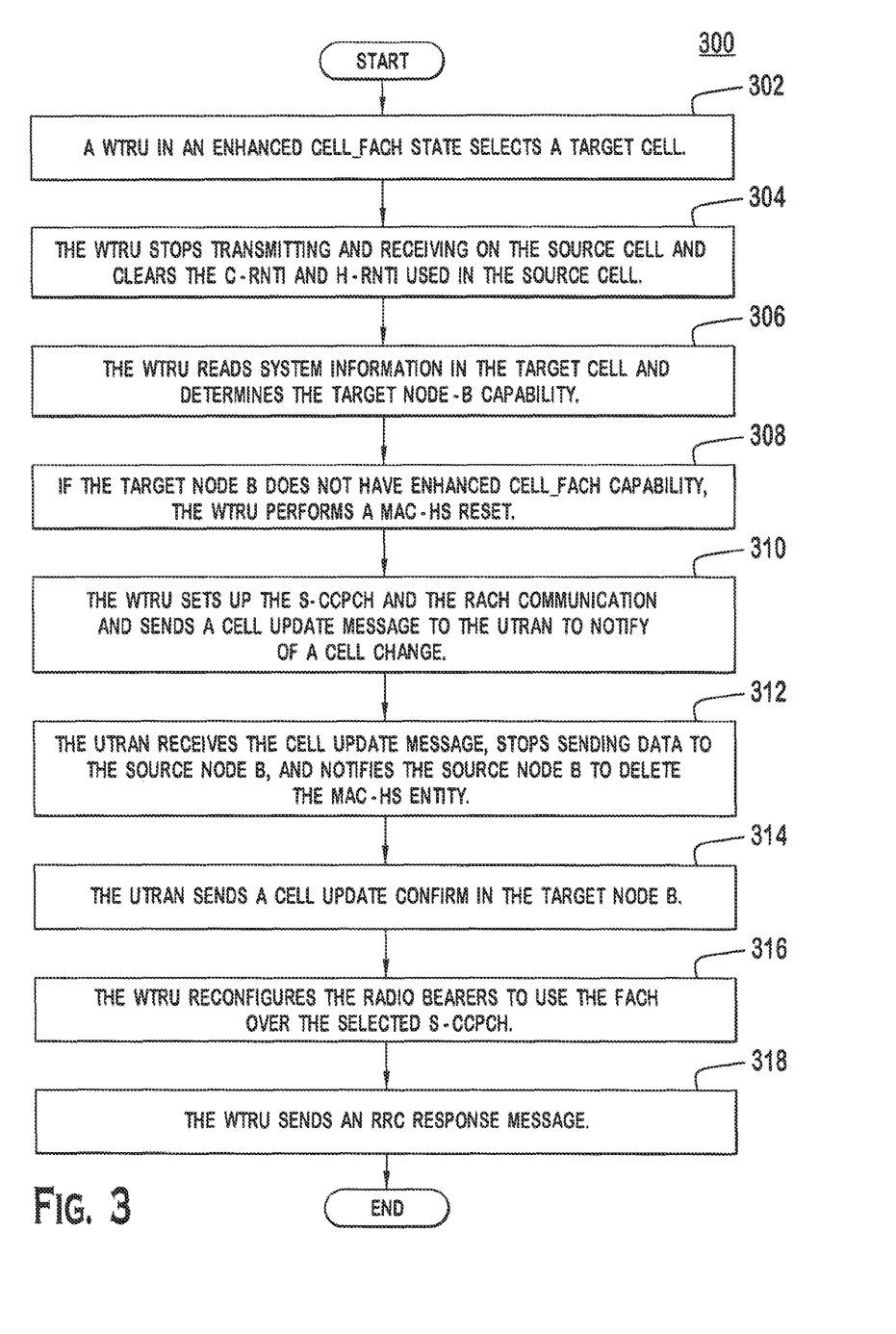
FIG. 3 is a flow diagram of an example process for cell update in accordance with another embodiment.

If the target Node B 120b has enhanced Cell_FACH capability, the following steps are performed. If the target Node B 120b does not have enhanced Cell_FACH capability, (i.e., cell reselection from an enhanced Cell_FACH cell to a non-enhanced Cell_FACH cell), the process 300 in FIG. 3 is performed. The WTRU 110 may perform a MAC-hs reset (step 208). This will flush the soft buffers and begin the disassembly process. The MAC-hs reset may need to be performed for both the common H-RNTI queue and dedicated H-RNTI queue.

The WTRU 110 may always perform a MAC-hs reset for both the common H-RNTI and dedicated H-RNTI. Alternatively, the WTRU 110 may perform a MAC-hs reset. only when the cell reselection results in an inter-Node B cell change or an intra-node B cell change for a Node B that does not support MAC-hs preservation. In this case, the intra-Node B cell change does not result in a MAC-hs reset if the Node B can maintain the MAC-hs entity. This requires some indication to the WTRU 110 about the Node B identity and capability, which may be broadcast as part of the system information either as a new information element to an existing SIB, or as a new SIB.

Alternatively, the WTRU 110 may perform a MAC-hs reset only for the case where reordering queues are used. If the WTRU 110 in enhanced Cell_FACH is not using reordering queues (for traffic on either the common H-RNTI or the dedicated H-RNTI), then a MAC-hs reset is not required. Optionally, the WTRU 110 may decide to flush the HARQ soft buffers instead of performing the MAC-hs reset.

Alternatively, the WTRU 110 may perform a MAC-hs reset only when reordering queues are used and the cell reselection results in an inter-Node B cell change or an intra-node B cell change for a Node B that does not support MAC-hs preservation.

The WTRU 110 then sets up the HSDPA communication as well as the RACH communication, and sends a CELL UPDATE message to the UTRAN to notify of a cell change (step 210). Optionally, the WTRU 110 may select an RH-RNTI index and provide this information in the CELL UPDATE message. The WTRU 110 begins downlink reception. The WTRU 110 looks for its H-RNTI in the HS-SCCH. The choice of the H-RNTI depends on the rules for assigning the H-RNTI as explained above. The WTRU 110 may use the common H-RNTI broadcast in the system information, may use an RH-RNTI as requested in the CELL UPDATE message, or may use a temporary H-RNTI based on a subset of the U-RNTI.

The UTRAN receives the CELL UPDATE message, stops sending data to the source Node B, notifies the source Node B to delete an old MAC-hs entity, and sets up a new MAC-hs entity in the target Node B (step 212). The UTRAN sends a CELL UPDATE CONFIRM message to the WTRU 110 through the target Node B with setup information for the HSDPA communication (in particular a dedicated. H-RNTI) (step 214). The H-RNTI used for the CELL UPDATE CONFIRM message depends on the rules for assigning the H-RNTI. The UTRAN may use the common H-RNTI broadcast in the system information, may use an RH-RNTI as requested in the CELL UPDATE message, or may use a temporary H-RNTI based on a subset of the U-RNTI. Alternatively, the CELL UPDATE CONFIRM message may be sent via the FACH.

The WTRU 110 sets up the HSDPA with the configuration information included in the CELL UPDATE CONFIRM message (step 216). The WTRU 110 responds with an RRC message, (for instance, a PHYSICAL CHANNEL RECONFIGURATION COMPLETE or a UTRAN MOBILITY INFORMATION CONFIRM, depending on whether physical layer parameters have been changed or not) (step 218).

In addition, performance may be improved if the WTRU 110 sends an RLC status report to allow the UTRAN to know which PDUs require retransmission after the WTRU MAC-hs reset. The RLC status report may be sent prior to sending the CELL UPDATE message but after selecting the target cell 122b. For this, the process 200 is modified. For example, after selecting the target cell 122b, the WTRU 110 stops receiving in the source cell 122a. The WTRU 110 then performs a MAC-hs reset. The WTRU 110 then. sends an RLC status report to the source Node B 120a, providing the sequence number of the last PDU received. The WTRU 110 then stops transmitting at the source cell 122a, and continues with step 210. Alternatively, the WTRU 110 may include the RLC status information as an IE in the CELL UPDATE message. This status information includes the last sequence number received at the WTRU 110. Alternatively, the WTRU 110 may wait until receiving the CELL UPDATE CONFIRM message to send an RLC status to the UTRAN, providing an indication of the sequence number of the last received PDU. The status information may be included, in a PHYSICAL CHANNEL RECONFIGURATION COMPLETE message or a UTRAN MOBILITY INFORMATION CONFIRM message.

Optionally, the MAC-hs reset may be removed and replaced with a reset indication from the UTRAN, carried in the CELL UPDATE CONFIRM message. In the CELL UPDATE message, the WTRU 110 may inform the UTRAN about its use of reordering queues (and if a reset is necessary). As the UTRAN is controlling the procedure, it can ensure that an intra-Node B cell change (with MAC-hs preservation) will not result in a MAC-hs reset, and a WTRU 110 with no re-reordering queues will not result in a MAC-hs reset. In lieu of the MAC-hs reset, the WTRU 110 may flush its HARQ soft buffers.

FIG. 3 is a flow diagram of a process 300 for cell update in accordance with another embodiment. In this embodiment, a WTRU 110 moves from a source cell 122a with enhanced Cell_FACH support to a target cell 122b with no enhanced Cell_FACH support. The WTRU 110 selects the target cell 122b (step 302). The WTRU 110 stops transmitting and receiving at the source cell 122a, and clears the C-RNTI and H-RNTI used in the source cell 122a (step 304). The WTRU 110 reads the system information from the target cell 122b and determines the target Node B capability (step 306). If the target Node B does not have enhanced Cell_FACH capability, the WTRU 110 performs a MAC-hs reset (step 308), The WTRU 110 sets up the S-CCPCH and the RACH communication and sends a CELL UPDATE message to the UTRAN to notify of a cell change (step 310). The WTRU 110 begins downlink reception on the selected S-CCPCH.

The UTRAN receives the CELL UPDATE message, stops sending data to the source Node B, and notifies the source Node B to delete the MAC-hs entity (step 312). The UTRAN sends a CELL UPDATE CONFIRM in the target Node B with information regarding the remapping of the radio bearers over the FACH using the S-CCPCH (step 314). The WTRU 110 reconfigures the radio bearers to use the FACH over the selected S-CCPCH (step 316). The WTRU 110 sends an RRC response message, (for instance, an RADIO BEARER RECONFIGURATION COMPLETE message) (step 318).

The WTRU 110 has three options to send the RLC status to the UTRAN as stated in the embodiment where the WTRU moves from a source cell with Enhanced Cell_FACH support to a target cell with Enhanced Cell_FACH support.

Figure 4:
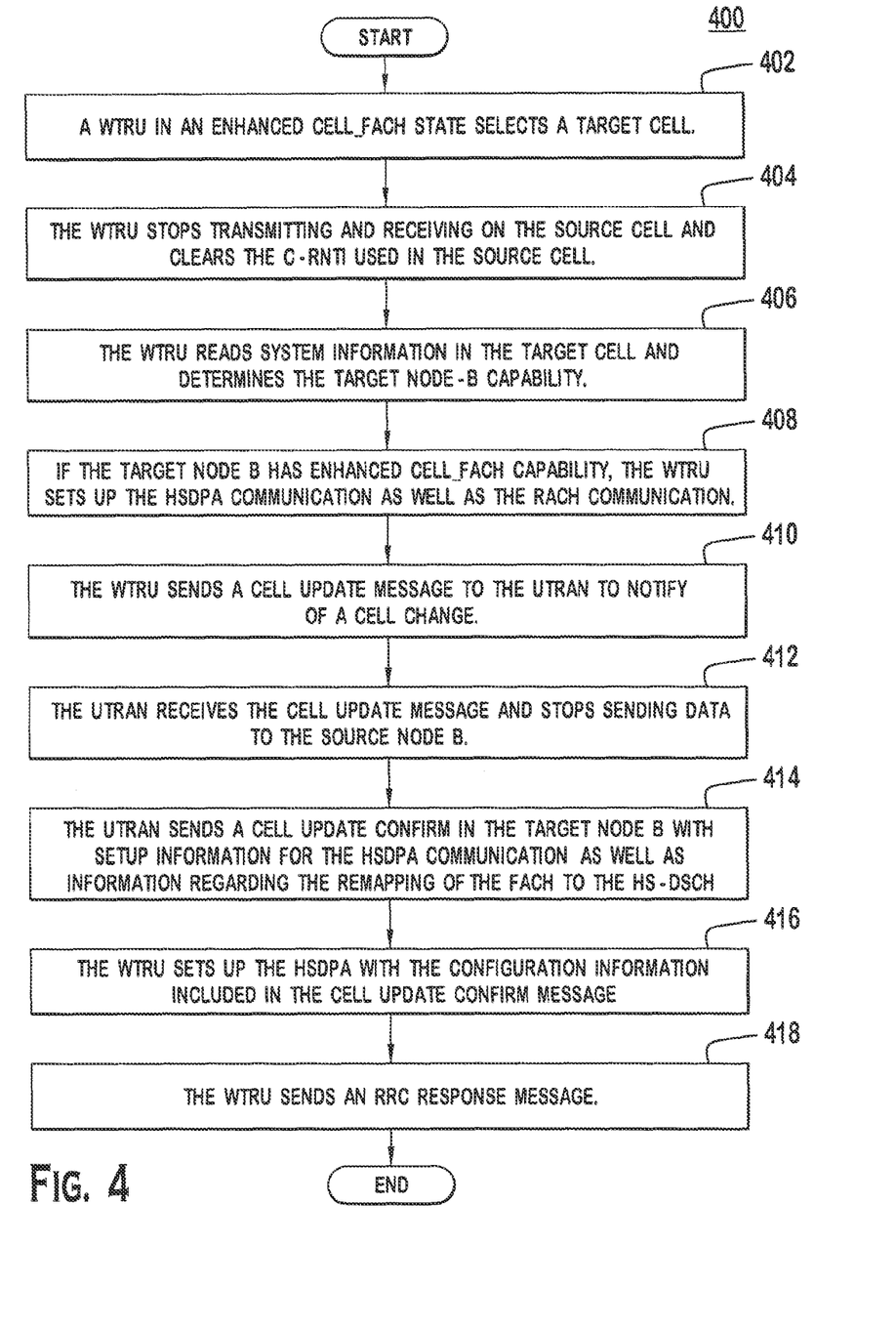
FIG. 4 is a flow diagram of an example process for cell update in accordance with yet another embodiment.

FIG. 4 is a flow diagram of a process 400 for cell update in accordance with yet another embodiment. In this embodiment, a WTRU 110 moves from a source cell 122a with no enhanced Cell_FACH support to a target cell 122b with enhanced Cell_FACH support, The WTRU 110 selects the target cell 122b (step 402). The WTRU 110 stops transmitting and receiving at the source cell 122a and clears the C-RNTI used in the source cell 122a (step 404). The WTRU 110 reads the system information from the target cell 122b and. determines the target Node B capability (step 406). If the target Node B has enhanced Cell_FACH capability, the WTRU 110 sets up the HSDPA communication as well as the RACH communication (step 408). If the target Node B does not have enhanced Cell_FACH capability, the conventional cell reselection procedure is performed.

The WTRU 110 sends a CELL UPDATE message to the UTRAN to notify of a cell change (step 410). Optionally, the WTRU 110 may select an RH-RNTI index and provide this information in the CELL UPDATE message. The WTRU 110 begins downlink reception. The WTRU 110 looks for its H-RNTI in the HS-SCCH. The choice of H-RNTI depends on the rules for assigning H-RNTIs. The WTRU 110 may use the downlink common H-RNTI as found in the system information, may use an RH-RNTI as requested in the CELL UPDATE message, or may use a temporary H-RNTI based on a subset of the U-RNTI, The UTRAN receives the CELL UPDATE message and stops sending data to the source Node B (step 412). The UTRAN sends a CELL UPDATE CONFIRM to the WTRU through the target Node B with setup information for the HSDPA communication (in particular a dedicated H-RNTI) as well as information regarding the remapping of the FACH to the HS-DSCH (step 414). The H-RNTI used for the CELL UPDATE CONFIRM message depends on the rules for assigning H-RNTIs. The UTRAN may use a downlink common H-RNTI as broadcast in the system information, may use an RH-RNTI as requested in the CELL UPDATE message may be used, or may use a temporary H-RNTI based on a subset of the U-RNTI.

The WTRU 110 sets up the HSDPA with the configuration information included in the CELL UPDATE CONFIRM message (step 416). The WTRU 110 sends an RRC response message, (for instance, a TRANSPORT CHANNEL RECONFIGURATION COMPLETE message) (step 418). The WTRU 110 may send an RLC status report to the UTRAN as stated in the embodiment where the WTRU moves from a source cell with Enhanced Cell_FACH support to a target cell with Enhanced Cell_FACH support.

Figure 5:
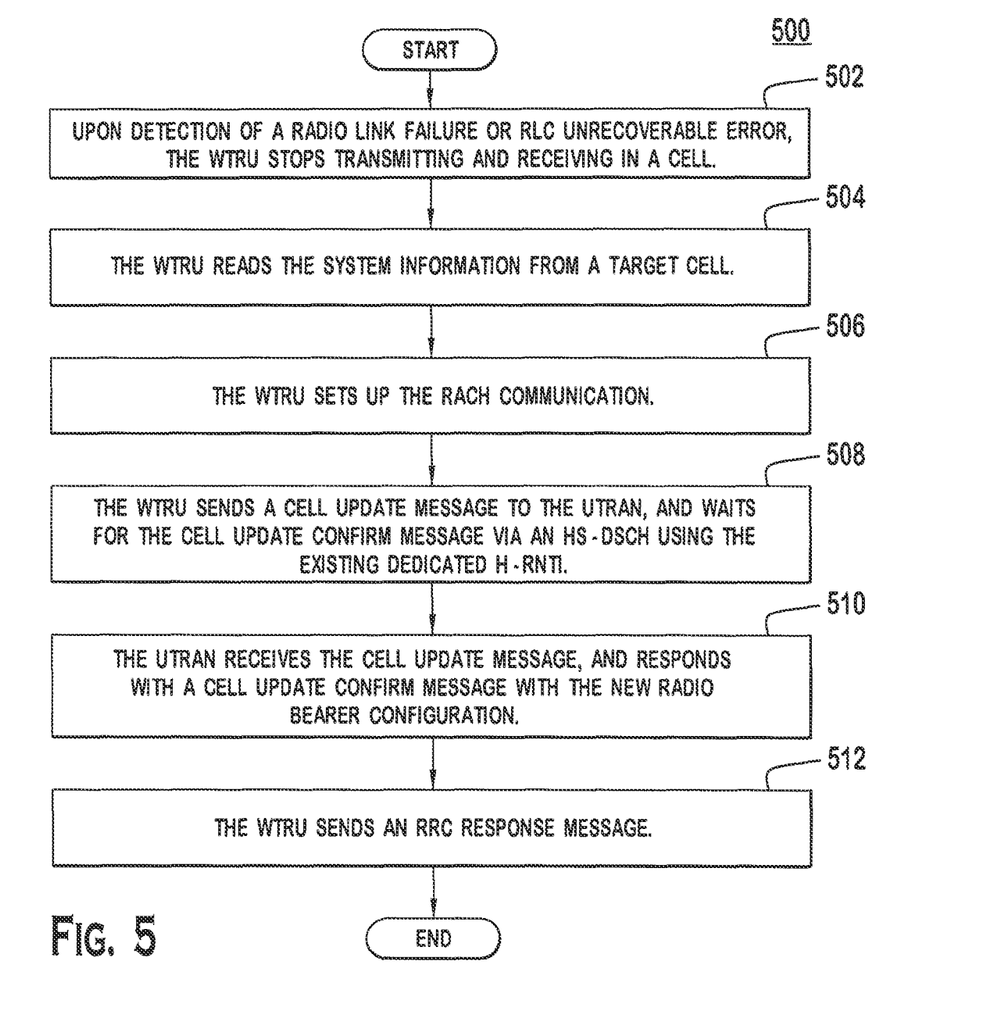
FIG. 5 is a flow diagram of an example process for cell update in accordance with still another embodiment.

FIG. 5 is a flow diagram of a process 500 for cell update in. accordance with still another embodiment. In this embodiment, a WTRU 110 transitions from a Cell DCH state to an enhanced Cell_FACH state. As the WTRU 110 is already in a Cell_DCH state, the WTRU 110 already has a dedicated H-RNTI and a valid HSDPA configuration. Rather than resetting the MAC-hs and re-establishing the already existing I-ISPDA link, the WTRU 110 may continue to use the configured HSDPA setup.

Figure 6:
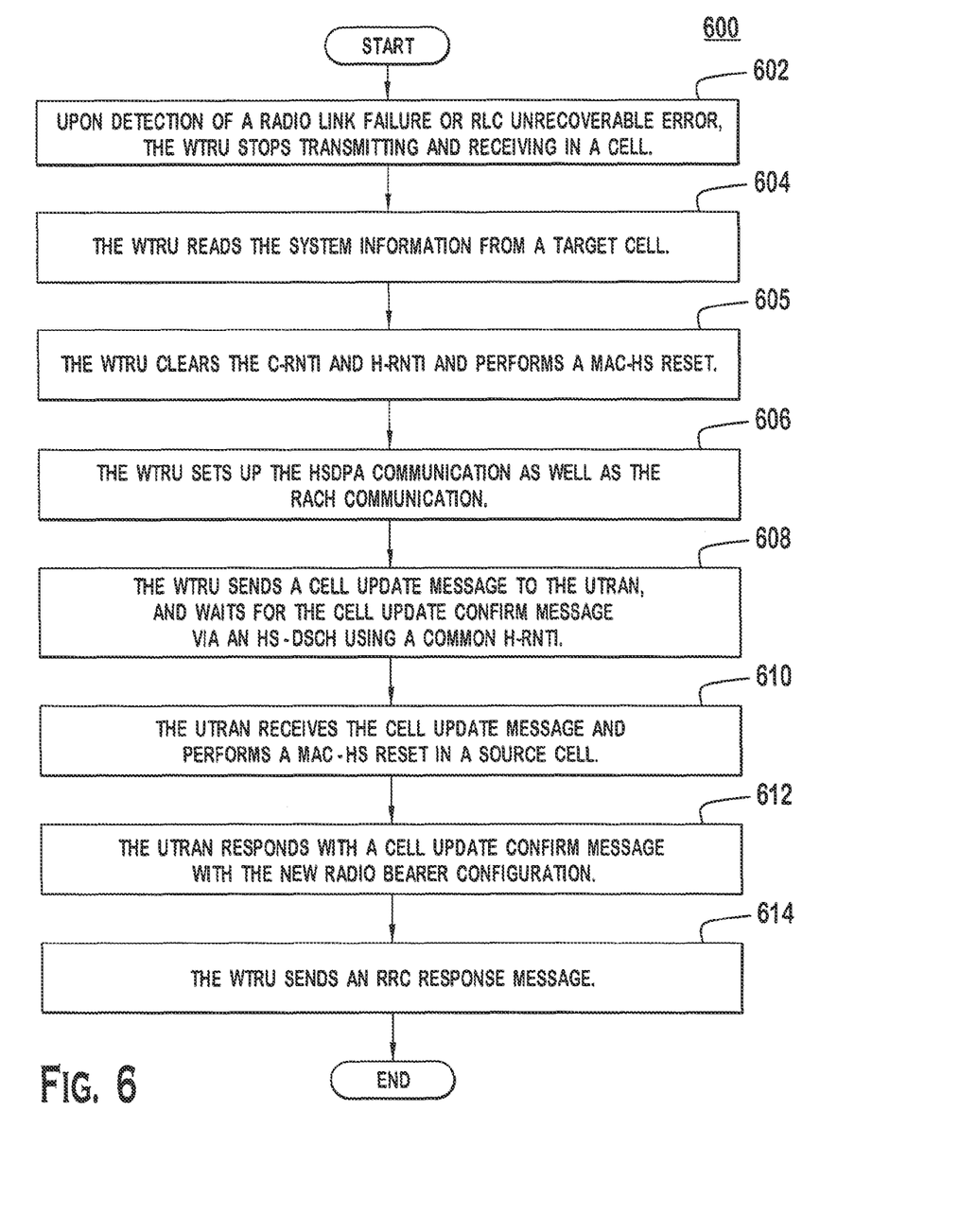
FIG. 6 is a flow diagram of an alternative process to the process in FIG. 5.

Upon detection of a radio link failure or RLC unrecoverable error, the WTRU 110 stops transmitting and receiving in a cell (step 502). The WTRU 110 reads the system information. from a target cell 122b (step 504). If the target Node B has an enhanced Cell_FACH capability, the following steps are performed. If the target Node B does not have an enhanced Cell_FACH capability, the conventional cell reselection procedure is performed. The WTRU 110 sets up the RACH communication (step 506). The WTRU 110 sends a CELL UPDATE message to the UTRAN, and waits for the CELL UPDATE CONFIRM message via an HS-DSCH using the existing dedicated H-RNTI (step 508). The UTRAN receives the CELL UPDATE message, and responds with a CELL UPDATE CONFIRM message with the new radio bearer configuration (step 510). The H-RNTI used for the CELL UPDATE CONFIRM message is the same dedicated H-RNTI that was used in the Cell_DCH state. The WTRU 110 reconfigures the radio bearers, and sends an RRC response message, (for instance, a RADIO BEARER RECONFIGURATION COMPLETE message) (step 512). The WTRU 110 may send an RLC status report to the UTRAN as stated in the embodiment where the WTRU moves from a source cell with Enhanced Cell_FACH support to a target cell with Enhanced Cell_FACH support, Alternatively, the MAC-hs entity may be reset and a new HSDPA configuration may be used. FIG. 6 is a flow diagram of an alternative process 600 to the process 500 in FIG. 5, where the WTRU uses a common H-RNTI instead of a dedicated H-RNTI. A WTRU 110 transitions from a Cell DCH state in a source cell 122a to an enhanced Cell_FACH state in a target cell 122b. Source and target cell may be the same cell. Upon detection of radio link failure or RLC unrecoverable error, the WTRU 110 stops transmitting and receiving in a cell and performs a MAC-hs reset (step 602). The WTRU 110 reads the system information from a target cell 122b (step 604). If a target Node B has an enhanced Cell_FACH capability, the following steps are performed. If the target Node B does not have an enhanced Cell_FACH capability, the conventional cell reselection procedure is performed. The WTRU clears the C-RNTI and H-RNTI and performs a MAC-hs reset (step 605). The WTRU 110 sets up the HSDPA communication as well as the RACH communication (step 606). The WTRU 110 sends a CELL UPDATE message to the UTRAN, and waits for the CELL UPDATE CONFIRM message via an HS-DSCH using a common H-RNTI (step 608).

The UTRAN receives the CELL UPDATE message and performs a MAC-hs reset. in a source cell (step 610). The UTRAN responds with a CELL UPDATE CONFIRM message with the new radio bearer configuration (step 612). The H-RNTI used for the CELL UPDATE CONFIRM message is the selected common H-RNTI. The WTRU 110 reconfigures the radio bearers, and responds with an RRC message, (for instance, a RADIO BEARER RECONFIGURATION COMPLETE message) (step 614). The WTRU 110 may send an RLC status report to the UTRAN as stated in the embodiment where the WTRU moves from a source cell with Enhanced Cell_FACH support to a target cell with Enhanced Cell_FACH support.

Figure 7:
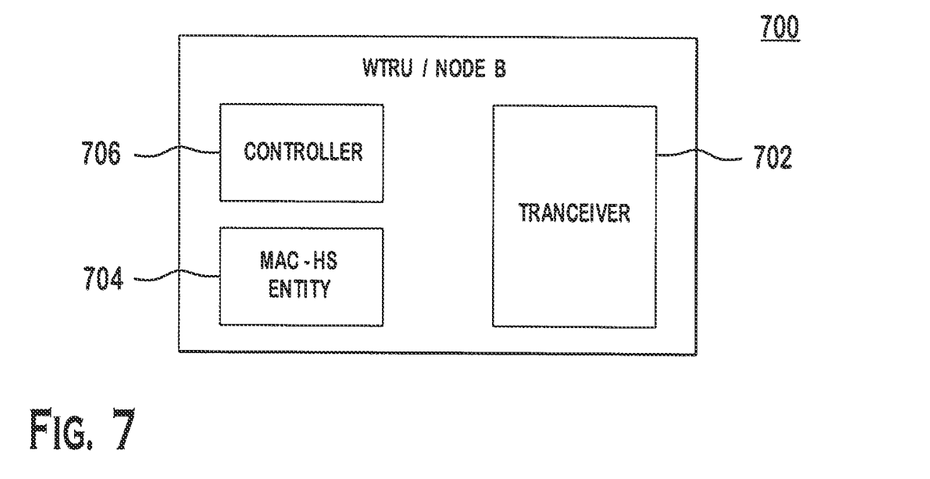
FIG. 7 is a block diagram of an example apparatus.

FIG. 7 is a block diagram of an example apparatus 700, (WTRU 110 or Node-B 120a, 120b), The apparatus 700 includes a transceiver 702, a MAC-hs entity 704, and. a controller 706. The transceiver 702 transmits and receives signals via physical medium, The MM-hs entity 704 is for HSDPA communication. The controller 706, (e.g., an RRC entity), controls the transceiver 702 and the MAC-hs entity 704 for performing the procedures 200-600 for the cell update and for transmission and reception while in a Cell_FACH state. The controller 706 is configured to, while in a Cell_FACH state, select a target cell 122b, read system information from the target cell 122b, clear a RNTI received in a source cell 122a, set a HS_IDSCH_RECEPTION control variable accordingly, and configure HSDPA communication based on HS-DSCH common system information included in the system information, reset the MAC-hs entity, etc.

Although the features and elements are described in embodiments in particular combinations, each feature or element can be used alone without the other features and elements of the embodiments or in various combinations with or without; other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (LTE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for performing a cell update while in a Cell_FACH state, the method comprising:
    detecting a cell update triggering event while receiving a high speed downlink packet access (HSDPA) transmission in a Cell_DCH state using a dedicated high speed downlink shared channel (HS-DSCH) radio network temporary identity (H-RNTI), the cell update triggering event comprising at least one of a radio link failure or a radio link control (RLC) unrecoverable error,
    clearing a radio network temporary identity (RNTI) received in a source cell,
    reading system information in a target cell, and
    based on common HS-DSCH system information included in the system information, resetting a high speed downlink shared channel (HS-DSCH) medium access control (MAC-ehs) entity, and enabling HS-DSCH reception by setting an HS-DSCH reception variable to TRUE.

2. The method of claim 1, further comprising:
sending a CELL UPDATE message via a random access channel (RACH); and
setting up HSDPA communication based on the common HS-DSCH system information included in the system information.

3. The method of claim 1, further comprising:
setting up a random access channel (RACH) communication.

4. A wireless transmit/receive unit (WTRU) for performing a cell update while in a Cell_FACH state, the WTRU comprising:
a controller configured to:
detect a cell update triggering event while receiving a high speed downlink packet access (HSDPA) transmission in a Cell_DCH state using a dedicated high speed downlink shared channel (HS-DSCH) radio network temporary identity (H-RNTI), the cell update triggering event comprising at least one of a radio link failure or a radio link control (RLC) unrecoverable error,
clear a radio network temporary identity (RNTI) received in a source cell,
read system information in a target cell, and
based on common HS-DSCH system information included in the system information, reset a high speed downlink shared channel (HS-DSCH) medium access control (MAC-ehs) entity, and enable HS-DSCH reception by setting an HS-DSCH reception variable to TRUE.

5. The WTRU of claim 4, wherein the controller is further configured to:
send a CELL UPDATE message via a random access channel (RACH); and
set up HSDPA communication based on the common HS-DSCH system information included in the system information.

6. The WTRU of claim 4, wherein the controller is further configured to set up random access channel (RACH) communication.

7. A method for performing cell reselection while in a Cell_FACH state, the method comprising:
receiving information from a source cell that supports Cell_FACH;
selecting a target cell for the cell reselection, wherein the target cell supports Cell_FACH or fails to support Cell_FACH;
reading system information broadcast from the target cell;
determining, based on the system information from the target cell, whether the target cell supports Cell_FACH; and
receiving information from the target cell based on whether the target cell supports Cell_FACH or fails to support Cell_FACH.

8. The method of claim 7, further comprising:
when the target cell supports Cell_FACH, performing at least one of the following:
clearing a high speed downlink shared channel (HS-DSCH) radio network temporary identity (H-RNTI) associated with the source cell,
clearing a cell radio network temporary identity (C-RNTI) associated with the source cell,
resetting an HS-DSCH medium access control (MAC-ehs) entity configured in the source cell,
configuring a MAC-ehs entity based on common HS-DSCH system information, or
receiving high speed downlink packet access (HSDPA) transmission in the target cell.

9. The method of claim 7, further comprising:
when the target cell fails to support Cell_FACH, performing at least one of the following:
clearing a radio network temporary identity (RNTI) received in the source cell;
resetting a high speed downlink shared channel (HS-DSCH) medium access control (MAC-ehs) entity configured in the source cell;
preventing HS-DSCH reception by setting an HS-DSCH reception variable to FALSE;
setting up secondary common control physical channel (S-CCPCH) and random access channel (RACH) communication; and
receiving downlink transmission on an S-CCPCH.

10. A wireless transmit/receive unit (WTRU) for performing cell update while in a Cell_FACH state, the WTRU comprising:
a controller configured to:
receive information from a source cell that supports Cell_FACH;
select a target cell for cell reselection, wherein the target cell supports Cell_FACH or fails to support Cell_FACH;
read system information broadcast from the target cell;
determine, based on the system information from the target cell, whether the target cell supports Cell_FACH; and
receive information from the target cell based on whether the target cell supports Cell_FACH or fails to support Cell_FACH.

11. The WTRU of claim 10, wherein the controller is further configured to:
when the target cell supports Cell_FACH, perform at least one of the following:
clear a high speed downlink shared channel (HS-DSCH) radio network temporary identity (H-RNTI) associated with the source cell,
clear a cell radio network temporary identity (C-RNTI) associated with the source cell,
reset an HS-DSCH medium access control (MAC-ehs) entity configured in the source cell,
configure a MAC-ehs entity based on common HS-DSCH system information, or receive high speed downlink packet access (HSDPA) transmission in the target cell.

12. The WTRU of claim 10, wherein the controller is further configured to:
when the target cell fails to support Cell_FACH, perform at least one of the following:
clear a radio network temporary identity (RNTI) received in the source cell;
reset a high speed downlink shared channel (HS-DSCH) medium access control (MAC-ehs) entity configured in the source cell;
prevent HS-DSCH reception by setting an HS-DSCH reception variable to FALSE;
set up secondary common control physical channel (S-CCPCH) and random access channel (RACH) communication; and
receive downlink transmission on an S-CCPCH.

* * * * *